US009381574B1

(12) United States Patent
Jackson

(10) Patent No.: US 9,381,574 B1
(45) Date of Patent: Jul. 5, 2016

(54) METHOD AND APPARATUS FOR CUTTING AND CLEANING A SUPERHARD SUBSTRATE

(71) Applicant: David P. Jackson, Saugus, CA (US)

(72) Inventor: David P. Jackson, Saugus, CA (US)

(73) Assignee: CLEANLOGIX LLC, Santa Clarita, CA (US)

( * ) Notice: Subject to any disclaimer, the term of this patent is extended or adjusted under 35 U.S.C. 154(b) by 160 days.

(21) Appl. No.: 14/335,875

(22) Filed: Jul. 18, 2014

(51) Int. Cl.
| | |
|---|---|
| *B23B 27/10* | (2006.01) |
| *B24B 37/00* | (2012.01) |
| *B24B 55/03* | (2006.01) |
| *B26D 7/08* | (2006.01) |

(52) U.S. Cl.
CPC ............... *B23B 27/10* (2013.01); *B24B 37/00* (2013.01); *B24B 55/03* (2013.01); *B26D 7/088* (2013.01); *B23B 2250/12* (2013.01)

(58) Field of Classification Search
CPC ..... B24B 55/03; B26D 7/088; B23B 2250/12
USPC ............... 451/7, 37, 39, 40.7, 53, 449, 450; 125/13.01
See application file for complete search history.

(56) References Cited

U.S. PATENT DOCUMENTS

| | | | | | |
|---|---|---|---|---|---|
| 5,419,732 | A * | 5/1995 | Kaneko | ............... | B23Q 11/1061 409/136 |
| 5,599,223 | A * | 2/1997 | Mains, Jr. | ............... | B24C 1/003 134/24 |
| 6,564,682 | B1 * | 5/2003 | Zurecki | ............... | B23Q 1/0018 407/11 |
| 6,786,977 | B2 * | 9/2004 | Spuller | ............... | C11D 7/5013 134/2 |
| 7,066,789 | B2 * | 6/2006 | Tannous | ............... | B08B 5/02 134/9 |
| 7,134,946 | B1 * | 11/2006 | Jackson | ............... | B24C 1/003 134/10 |
| 7,414,015 | B2 * | 8/2008 | Skerlos | ............... | B23Q 11/1053 184/6.26 |
| 7,451,941 | B2 * | 11/2008 | Jackson | ............... | B08B 1/00 239/419 |
| 7,601,112 | B2 * | 10/2009 | Jackson | ............... | B08B 3/06 134/1.2 |
| 7,637,187 | B2 * | 12/2009 | Zurecki | ............... | B23Q 11/1053 407/11 |
| 8,048,830 | B1 * | 11/2011 | Jackson | ............... | C10M 125/00 508/154 |
| 2002/0035043 | A1 * | 3/2002 | Yokota | ............... | C10M 105/32 508/485 |
| 2002/0155792 | A1 * | 10/2002 | Jackson | ............... | B08B 7/0092 451/39 |
| 2003/0051741 | A1 * | 3/2003 | DeSimone | ............ | B08B 7/0021 134/21 |
| 2003/0110781 | A1 * | 6/2003 | Zurecki | ............... | B23Q 11/1053 62/64 |

(Continued)

*Primary Examiner* — Joseph J Hail
*Assistant Examiner* — Marc Carlson
(74) *Attorney, Agent, or Firm* — Law Office of David Hong

(57) ABSTRACT

An apparatus and method for machining a superhard substrate comprising: a means for pre-cooling a non-aqueous cutting fluid at a temperature below 20 degrees C. and at atmospheric pressure to form a subcooled cutting fluid; a capillary tube injector, which saturates said subcooled cutting fluid with the solid and gas carbon dioxide; an inline static mixer for combining said subcooled cutting fluid and said solid and gas carbon dioxide; a spray application tool for applying said carbon dioxide saturated subcooled cutting fluid to the superhard substrate during a machining process; and a recovering apparatus for collecting said residual cutting fluid from the machined superhard substrate; said recovering apparatus can comprise a carbon dioxide spray cleaning, a liquid carbon dioxide immersion cleaning, or a supercritical carbon dioxide cleaning.

19 Claims, 5 Drawing Sheets

(56) References Cited

U.S. PATENT DOCUMENTS

| | | | | |
|---|---|---|---|---|
| 2003/0205510 A1* | 11/2003 | Jackson | B01D 17/0205 | 210/86 |
| 2003/0207655 A1* | 11/2003 | Jackson | B08B 1/00 | 451/38 |
| 2004/0244818 A1* | 12/2004 | Fury | B08B 7/0021 | 134/2 |
| 2006/0053987 A1* | 3/2006 | Ghosh | B23B 27/10 | 82/1.11 |
| 2007/0084263 A1* | 4/2007 | Zurecki | B21C 9/005 | 72/342.3 |
| 2007/0087664 A1* | 4/2007 | Ghosh | B23P 25/003 | 451/7 |
| 2007/0114488 A1* | 5/2007 | Jackson | B23Q 11/1053 | 252/71 |
| 2007/0259766 A1* | 11/2007 | Jackson | B08B 3/06 | 494/36 |
| 2013/0203237 A1* | 8/2013 | Yamaguchi | H01L 21/306 | 438/460 |

\* cited by examiner

EXEMPLARY CLOSED-LOOP CUTTING-CLEANING PROCESS

Fig. 3a (A). Uncut substrates transferred from a cassette to an exemplary dicing tool;

Fig. 3a (B). Substrates sliced using exemplary dicing tool during which dicing fluid apparatus delivers cold carbonated (and optionally oxygenated) cutting fluid into cut zone, described under FIG. 2;

Fig. 3a (C). Diced substrates are transferred to carbon dioxide spray cleaning system ('154) for gross cutting fluids recovery (72) and fine particle removal; and optionally -

Fig. 3a (D). Diced and gross cleaned substrates are transferred to a centrifugal liquid carbon dioxide immersion cleaning system ('112) for precision degreasing and cutting fluids recovery (72) for reuse; and Fig. 3a (E). Diced and Cleaned substrates are transferred to cassette; or Fig. 3a (F). Diced and Cleaned substrates are transferred to metrology for inspection.

FIG. 3b

METHOD AND APPARATUS FOR CUTTING AND CLEANING A SUPERHARD SUBSTRATE

FIELD OF INVENTION

The present invention relates generally to machining coolants and lubricants and more particularly to method for dicing and dry cleaning a superhard substrate during dicing operations.

BACKGROUND OF INVENTION

Large volumes of machining and metalworking fluids (MWFs) are used in manufacturing industries for cooling and lubrication of a variety of substrates—metals, plastics, ceramics—and tools during machining. Heat removal from the chip surface and chip-tool interface involves both macroscopic and microscopic mechanisms. Macroscopic heat elimination involves a fluid contacting chip, workpiece, and tool to remove machining heat and microscopic heat management involves reactive fluid constituents entering and reacting with chip-tool interface to reduce friction.

Increasing the velocity of a metalworking fluid is a conventional means for improving heat removal. Boundary layer velocities increase, turbulence increases and deeper cutting zone penetration can be achieved through increased fluid velocity (pressure), all of which improves heat removal. In the prior art a variety of methods are taught for forming and delivering high pressure and high velocity metalworking fluids. For example in an article entitled "Using High-Pressure Fluids", R. Aronson, Manufacturing Engineering, June 2004, Vol. 132, No. 6, Aronson discusses the importance of matching the metalworking fluid velocity to that of the cutting tool to allow the fluid to enter the cut zone to remove heat and chips. A number of challenges are associated with increased pressure. These include a need for expensive high pressure pumps and machining tool seal modifications to handle increased pressure.

However besides fluid pressure, a number of other factors can be considered to improve boundary layer fluid velocity. Metalworking fluid properties such as viscosity, surface tension, molecular size, and reactivity predominate at the cutting surfaces and within capillary interfaces. These physicochemical properties can be optimized to allow the metalworking fluid to penetrate the cutting zone more efficiently and to flow along surfaces at much higher velocities. For example, lowering viscosity and surface tension of the metalworking fluid is a way of improving boundary layer velocity to enhance heat extraction.

A conventional method for lowering viscosity and surface tension is to use base stock fluids having extremely low viscosities and surface tension. For example, high pressure liquid or supercritical carbon dioxide (aka dense fluids) can be used as a bulk metalworking fluid (solvent), into which lubricant additives (solutes) are added, to provide the necessary reactive boundary layer constituents. However, like the high pressure metalworking fluid discussed above, these newer approaches are particularly expensive and complicated requiring specially designed high pressure plumbing in machining tools. For example, the fluid seals of most machining tools cannot tolerate the pressures and in particular the sealing dynamics (zero surface tension and very low viscosity) required to maintain and transport a dense fluid through the machining conduits.

A newer technique developed by the present inventor for improving penetration utilizes high velocity solid phase carbon dioxide composite coolant-lubricant sprays. Composite $CO_2$ sprays resolve the high pressure limitations of dense fluids by delivering the beneficial chemistry of a dense fluid within a solid phase packet which is delivered in relatively low-pressure compressed air. A drawback of this approach is that a composite spray cannot be maintained as a solid-gas-liquid mixture through long distances through tortuous plumbing schemes found in many machining tools. A patent issued to the present inventor related to same, U.S. Pat. No. 8,048,830, teaches the use of a carbonated cutting fluid for machining applications. In the '830 invention, the present inventor utilizes a pressure pot or vessel to saturate a cutting fluid with carbon dioxide gas via high pressure compression into a machining fluid. A major drawback with this approach is that the use of pressure and a pressure vessel is both expensive and dangerous to workers. Another drawback is the cutting fluid must be delivered to the cutting zone under pressure using a suitable spray nozzle as taught in '830 or under pressure through a machining spindle to maintain gas saturation. This complicates delivery and adds considerable cost. Moreover, the invention of '830 produces excessive (or super-saturation) frothing of cutting fluid formulations. The formation of excessive foamy fluids is problematic for both machining processes and equipment (i.e., pump cavitation problems, sump overflow issues).

The present inventor has developed a much more efficient and more stable approach. The present invention utilizes non-aqueous cutting fluids (or mixtures and additives with same) having very low freeze points, and which exhibit minimal frothing, and which allow for the saturation with carbon dioxide under ambient pressure and at a lower ambient temperature. Using this approach both super-saturation and a large temperature gradient in the bulk fluid can be achieved, both of which are beneficial for cutting operations.

Following machining operations, cutting fluids which have accumulated on cut substrates and fixtures must be removed prior to the next manufacturing step. Conventionally, most cut substrates and fixtures are cleaned using aqueous, semi-aqueous or organic solvent-based methods. These conventional cleaning methods produce waste streams including unusable recovered cutting fluids containing solvent or water residues, sludge, and wastewater. These processes also consume significant amounts of energy for drying, pumping, treating and recovering cleaning fluids. New hybridized processes are needed that integrate both machining and cleaning fluid operations since both processes are inextricably linked.

Today, the predominant mode of cooling and lubricating a substrate during machining involves temperature-controlled flooded applications of various cutting fluids. The predominant mode of cleaning a cut substrate involves aqueous cleaning fluids, deionized water rinsing, and hot air drying processes. Both cutting fluids and cleaning fluids are necessary in most cases, however conventional approaches produce vast amounts of waste by-products and consume huge amounts of natural resources and energy. There exists a need to improve the performance of these fluids and operations.

As such the present invention provides a means for boosting cooling and lubrication performance of conventional cutting fluids and delivery systems, and provides a means for cleaning cut substrates and recovering residual cutting fluids for use within the machining operation. Cleaner machining processes produce higher quality cut and cleaned substrates with higher productivity using less energy and do not produce waste cutting fluids and cleaning fluids that must be treated or hauled away.

SUMMARY OF THE PRESENT INVENTION

A method for machining a superhard substrate comprising the steps of:
  a. Cooling a non-aqueous cutting fluid to a temperature below 20 degrees C. and at atmospheric pressure to form a subcooled cutting fluid;
  b. Saturating said subcooled cutting fluid with carbon dioxide to form a carbon dioxide saturated subcooled cutting fluid;
  c. Applying said carbon dioxide saturated subcooled cutting fluid to the superhard substrate during a machining process; and
  d. Recovering said cutting fluid using a carbon dioxide spray cleaning, a liquid carbon dioxide immersion cleaning, or a supercritical carbon dioxide cleaning.

The method further having the non-aqueous fluid comprising alkenes, alkanes, alkynes, esters, alcohols, glycols, silanes, siloxanes, silanols, synthetic, semi-synthetic, bio-based, oxygenated fluid, or ozonated fluid; the carbon dioxide is a mixture of gas and solid; the temperature of the cutting fluid is between −40 degrees C. and +20 degrees C.; the temperature of the cutting fluid is between −20 degrees C. and +10 degrees C.; the superhard substrate can be a vitreous, crystalline, or aggregate material; the superhard substrate is sapphire, carbide, ceramic, glass, or silicon; the machining process is dicing, turning, lapping, polishing, or grinding; the machining process can also use a machining tool comprising a dicing blade, a cutting insert, a grinding tool, a polishing tool, or a lapping tool; the subcooled carbon dioxide saturated cutting fluid can be sprayed at said machining tool or is sprayed through said machining tool; the cutting fluid exhibits high solubility for carbon dioxide; the cohesion parameter of said cutting fluid is between 12 MPa½ and 30 MPa½; the cutting fluid can contain anti-corrosion, anti-foaming, or extreme pressure additives.

A method for machining a superhard substrate comprising the steps of:
  a. Cooling a non-aqueous cutting fluid to a temperature below 20 degrees C. and at atmospheric pressure to form a subcooled cutting fluid;
  b. Saturating said subcooled cutting fluid with carbon dioxide to form a carbon dioxide saturated subcooled cutting fluid; and
  c. Applying said carbon dioxide saturated subcooled cutting fluid to the superhard substrate during a machining process.

The method further having said cutting fluid is removed from the superhard substrate using a carbon dioxide cleaning spray, a liquid carbon dioxide immersion cleaning or a supercritical carbon dioxide cleaning; the non-aqueous fluid can comprises alkenes, alkanes, alkynes, esters, alcohols, glycols, silanes, siloxanes, silanols, synthetic, semi-synthetic, bio-based, oxygenated fluid, or ozonated fluid; the superhard substrate is a vitreous, crystalline, or aggregate material.

An apparatus for machining a superhard substrate comprising:
  a. A means for pre-cooling a non-aqueous cutting fluid at a temperature below 20 degrees C. and at atmospheric pressure to form a subcooled cutting fluid;
  b. A capillary tube injector, which saturates said subcooled cutting fluid with the solid and gas carbon dioxide to form a carbon dioxide saturated subcooled cutting fluid;
  c. An inline static mixer for combining said subcooled cutting fluid and said solid and gas carbon dioxide;
  d. A spray application tool for applying said carbon dioxide saturated subcooled cutting fluid to the superhard substrate during a machining process; and
  e. A recovering apparatus for collecting said residual cutting fluid from the machined superhard substrate; said recovering apparatus comprises a carbon dioxide spray cleaning, a liquid carbon dioxide immersion cleaning, or a supercritical carbon dioxide cleaning.

The apparatus further having the non-aqueous fluid, including without limitation, alkenes, alkanes, alkynes, esters, alcohols, glycols, silanes, siloxanes, silanols, synthetic, semi-synthetic, bio-based, oxygenated fluid, or ozonated fluid.

A method for machining a superhard substrate, which is a vitreous, crystalline, or aggregate material, comprising the steps of:
  a. Cooling a non-aqueous cutting fluid to a temperature below 20 degrees C. and at atmospheric pressure to form a subcooled cutting fluid;
  b. Saturating said subcooled cutting fluid with carbon dioxide to form a carbon dioxide saturated subcooled cutting fluid; and
  c. Applying said carbon dioxide saturated subcooled cutting fluid to the superhard substrate during a machining process.
  d. Recovering said cutting fluid using a carbon dioxide spray cleaning, a liquid carbon dioxide immersion cleaning, or a supercritical carbon dioxide cleaning.

The method further having the non-aqueous fluid comprises alkenes, alkanes, alkynes, esters, alcohols, glycols, silanes, siloxanes, silanols, synthetic, semi-synthetic, bio-based, oxygenated fluid, or ozonated fluid.

Solid carbon dioxide is used to cool and saturate an anhydrous and high boiling organic fluid (and optional additives) having a solubility parameter similar to carbon dioxide to form a cooled, gas-saturated bubbly flow cutting fluid for machining extremely hard materials such as ceramics and superalloys. An auxiliary refrigeration system is used to subcool the organic cutting fluid to further enhance carbon dioxide fluid saturation, and subsequent Joule-Tompson (JT) expansion and bubbly flow cooling. Optional ozonolysis is used to oxygenate said cold carbonated fluid to produce a cold carbonated and super-oxygenated cutting fluid. Said cutting fluid is injected into the entrance between a cutting tool such as a rotating wafer dicing blade and substrate. Upon entrance into the cut zone, extreme pressures and temperatures force carbon dioxide out of solution to form a cooling-expanding bubbly flow field. The cold bubbly flow field enhances both cutting heat dissipation and particle removal from the cutting zone, the dicing wheel cutting surfaces and substrate, and from the hydrocarbon fluid through both JT and froth-flotation mechanisms, respectively.

The present invention utilizes a novel method and apparatus for optimizing physicochemical properties of an organic cutting fluid. The present invention utilizes, for example, high-boiling bio-based alcohols, alkenes and other beneficial compounds, and mixtures of same, having component or mixture freeze points below 32 degrees C. These components or mixtures are first subcooled and then saturated with a subcooled carbon dioxide coolant. Cutting fluid and fluid compositions (behaving as solvent) suitable for use in the present invention are selected based upon their low foaming characteristics and solubility parameters being very similar to carbon dioxide ($CO_2$) coolant chemistry (behaving as solute). Cutting fluid and $CO_2$ are combined to form a subcooled 2-phase (gas-in-liquid) and semi-quiescent bubbly flow cutting fluid mixture. Under the influence of the energy of the cutting zone—both mechanical and thermal loads—fluid temperature rise and agitation causes the formation of minute $CO_2$ gas bubbles which stream from cutting surfaces (tool face and workpiece) which carries away heat and cutting particles. Rising $CO_2$ bubbles greatly enhance the heat transfer from cutting tool and workpiece counter-faces, displacing the cutting fluid as it moves and via the wake generated by the $CO_2$ bubble, increasing the mixing of the cutting fluid. Bubbly flow drains from cut surfaces and cutting tools more quickly than conventional non-carbonated cutting fluids, and is recovered, filtered, re-refrigerated and carbonated for reuse.

The novel machining fluid method of the present invention is further enhanced with the use of exemplary $CO_2$ immersion and spray cleaning processes developed by the present inventor to remove coolant residues from cut surfaces for recovery and reuse.

In a first aspect of the present invention and in contrast to prior art using carbon dioxide, high boiling-low freeze point bio-based alcohol and alkene-based coolant-lubricant mixtures (collectively referred to as "cutting fluids") are employed as a cutting fluid stock. These specific cutting fluids are first cooled to below 32 degrees F., into which a cold $CO_2$ aerosol (solid-gas) is injected and mixed into solution to form a cold carbon dioxide saturated cutting fluid. Under certain dissolved carbon dioxide gas conditions (near-saturation and saturation) beneficial changes in flow, penetration and heat transfer qualities are exhibited by the carbonated cutting fluid when applied during a machining operation. Cold carbonated cutting fluids flow at higher velocity due to less internal friction through machine plumbing and most importantly through tool fixtures such as spray-through-tool cutting tools. Of particular importance, cold carbonated metalworking fluid pressurized through a cutting tool-workpiece interface exhibit lower viscosity and surface tension. This enhances wettability of and penetration of the metalworking fluid constituents into the cutting interfaces.

In this aspect of the present invention, solid-gas carbon dioxide is injected into a subcooled metalworking fluid to form a cold and carbonated (quiescent) metalworking fluid at standard pressure. To accomplish this, a liquid phase is condensed to a fine solid-gas mixture phase which may be injected into a feed line just ahead of a conventional liquid pump or may be used to cool and carbonate a bulk tank containing a metalworking fluid. Another advantage of injecting a solid-gas carbon dioxide into a cutting fluid is improved heat and mass transfer. A sublimating solid-gas-liquid interface exhibits greater heat transfer due to a much larger $\Delta T$ as compared to conventional carbonation methods employing gas-only injection. Solid phase carbon dioxide particles sublimate and further cool the surrounding liquid. Although this injection technique is taught in the '830 invention by the present inventor, it has been determined through experimentation that injection of a solid-gas carbon dioxide aerosol into a specific type of carbon dioxide-compatible cutting fluid (or fluid mixture) having a first starting fluid temperature of below 32 degrees F. (0 degrees C.) produces much higher and more stable gas saturation levels. As such the present invention overcomes the limitations of the prior art; providing a more efficient means for producing a supersaturated carbonated cutting fluid and transporting same under ambient pressure, requiring no auxiliary high pressure transport and pressure regulation systems.

It is known in the prior art that dissolved gases enhance fluid heat transfer properties. For example, in an article entitled "Effect of Pressure, Subcooling, and Dissolved Gas on Pool Boiling Heat Transfer From Microporous Surfaces in FC-72", Journal of Heat Transfer, February 2003, Volume 125, Issue 1, pp. 75-83, dissolved gas tends to increased droplet heat transfer by increasing splat area. However the present inventor believes that this principle or approach has not been applied under ambient pressure and low temperature conditions to enhance heat transfer in cutting fluids in-situ. Moreover as compared other inorganic gases such as dissolved air and nitrogen, the utilization of carbon dioxide with hydrocarbon-based cutting fluid compositions has the added advantage of greatly enhancing solubility and dissolved gas content, due to the unique hydrocarbon-like properties of carbon dioxide.

Still moreover, carbon dioxide chemistry is known to provide additional benefits in certain machining applications. Carbon dioxide as a machining fluid has been investigated thoroughly and established to have a very positive impact in certain machining operations. In a reference book entitled *Tribology in Metalworking—Friction, Lubrication and Wear*, Schey, American Society for Metals, 1983, a number of researchers and related articles are noted describing the various beneficial effects upon machining operations and tool wear when using gas or liquid carbon dioxide fluids. Ponduraev determined with CBN tools that a deduction in wear results when CO2 gas is admitted to the atmosphere of the cutting zone, removing oxygen and reducing oxidation (V. N. Ponduraev, Russian Eng. J., 59 (3), 1979, pp. 42-44, Study of Cubic Boron Nitride (CBN) Tools). Hollis determined that Liquid $CO_2$ sprayed at base of carbide tool tip retards crater wear (W. S. Hollis, Int. J. Mach. Tool Des. Res., 1, 1961, pp. 59-78, Study of Carbide Tool). Zorev et al noted that CO2 gas increases tool life by allowing a larger, protective BUE to form on high speed steel (HSS) (N. N. Zorev and N. I. Tashlitsky, Machinability, ISI Spec., Rep. 94, Iron Steel Institute, London, 1967, pp. 31-34). Schey notes that gases such as $CO_2$ not only lubricate, but also cool (Tribology in Metalworking, Friction, Lubrication and Wear, John Schey, American Society for Metals, 1983, pp. 624-625). Ham and others have noted that cutting tool life increases when $CO_2$ gas is cooled to −40 C to −60 C, even when cutting forces may rise (I. Ham, K. Hitomi and G. L. Thuering, Trans. ASME, 83, 1961, pp. 142-154; L. Walter, Can. Mach. Metalwork., 76(8), 1965, pp. 94-97; and F. A. Monahan et al, Am. Mach., 104 (May 16), 1960, pp. 109-124).

Suitable cutting fluids preferably have low freezing points, but most preferably possess cohesion or solubility parameters similar to $CO_2$. In addition, and related to low total and particularly polar cohesion energy content, suitable cutting fluids are chosen for their limited (or near-zero) water solubility so as to prevent atmospheric water absorption and build-up when used continuously under low temperature to achieve higher bubbly flow $CO_2$ concentrations.

In another aspect of the present invention, cutting fluids of the present invention may be ozonated in accordance with a co-pending patent application by the present inventor to provide super-oxygenation of the cutting fluid chemistry. Following this carbon dioxide may be injected into the oxygenated cutting fluid to expel residual ozone gas, and to form a cold carbonated and oxygenated cutting fluid chemistry.

In still another aspect of the present invention is the use of carbon dioxide-based cleaning processes—spray and immersion—developed by the present inventor to remove residual cutting fluids from cut substrates to produce ultraclean substrates and recovered cutting fluids for machining operations.

Thus the present invention uniquely provides a method for 1) enhancing nucleate boiling within the cut zone which increases the maximum amount of machining heat that can be dissipated, 2) plasticizing the metalworking fluid to lower surface tension and viscosity, 3) providing additional lubrication benefits due to carbon dioxide fluid co-present in the cutting zone with the metalworking fluid, 4) means for increasing oxygen content of the cutting fluid mixture, and 5) a means for recovering residual cutting fluids using carbon dioxide for recovery and reuse.

Other objects and features of the invention will be evident hereinafter by reference to the following figures.

DESCRIPTION OF FIGURES

FIG. 3b shows a flowchart of an exemplary process for delivering and recovering a cutting fluid in a closed-loop dicing operation.

DETAILED DESCRIPTION OF INVENTION

Figure 1:
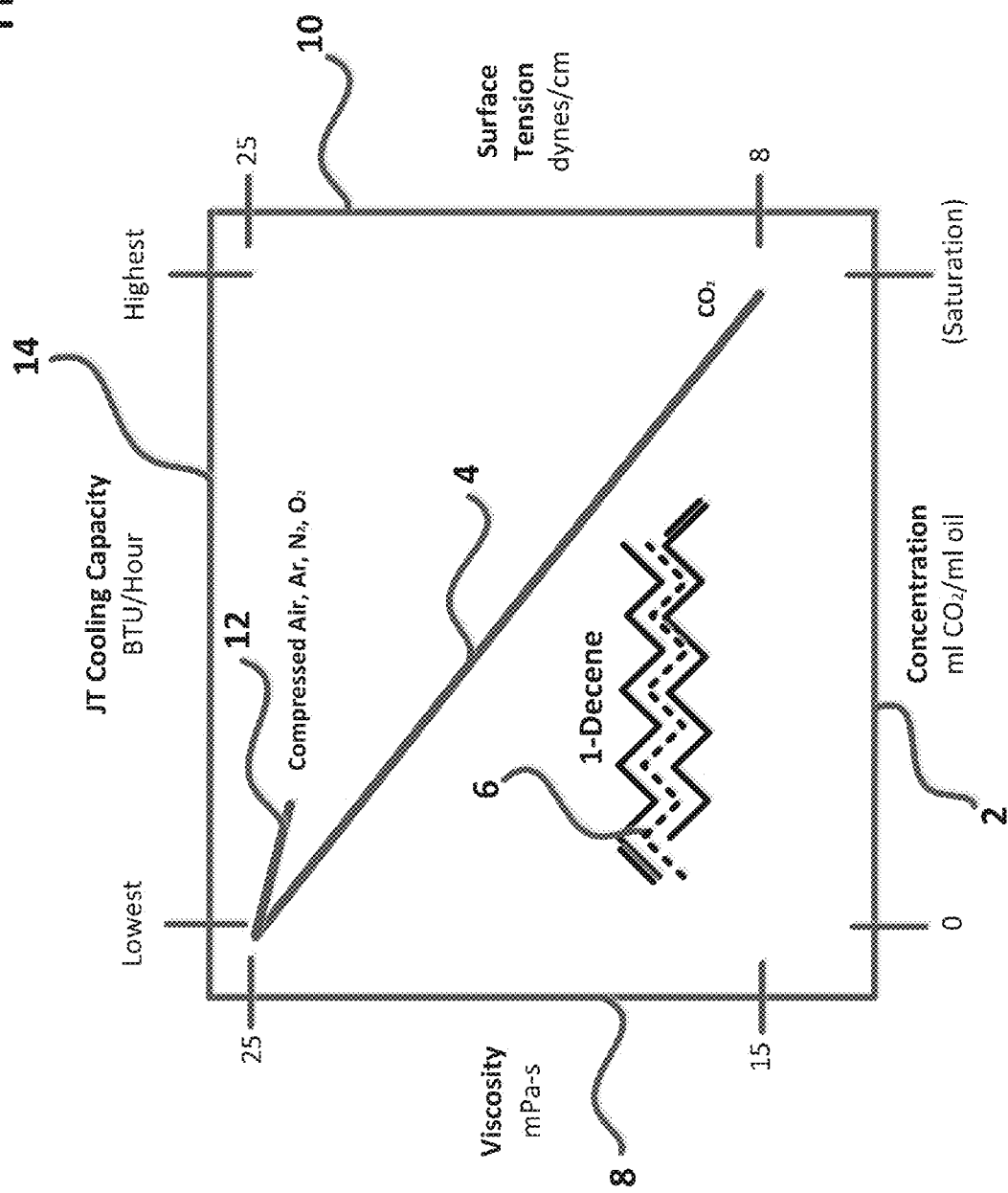
FIG. 1 shows a diagram, which depicts the changes in cutting oil viscosity and surface tension with increasing carbon dioxide saturation.

FIG. 1 describes the beneficial changes to a pure hydrocarbon cutting fluid (1-decene as an example) saturated with carbon dioxide. Under increasing concentration (2), dissolved carbon dioxide (4), behaving as solute, plasticizes 1-decene molecules, behaving as solvent, by filling in the molecular spaces between long-chain hydrocarbon molecules as depicted (6). As a result, both oil viscosity (8) and surface tension (10) are lowered appreciably as shown in the figure. Compared to gases such as argon, air, nitrogen and oxygen (12), carbon dioxide (4) imparts significant changes in the physicochemical properties of 1-decene. The volume of carbon dioxide dissolved in 1-decene increases with lower temperature and in this case also due to the cutting fluid and carbon dioxide having very similar cohesion chemistry (between 12-30 $MPa^{1/2}$). As such both lower temperature and comparable cohesion chemistries favor gas saturation and higher cooling capacity (14) cutting fluids are chosen having cohesion chemistry that is very similar to carbon dioxide.

Cutting fluids suitable for the present invention include compounds and mixtures having two important characteristics. Firstly, the cutting fluid must exhibit a solubility or cohesion parameter which is very similar to carbon dioxide, preferably ranging between 12 $MPa^{1/2}$ and 30 $MPa^{1/2}$. This property implies (a.) high solubility of carbon dioxide in cutting fluid for JT expansion cooling and (b.) high solubility of cutting fluid in carbon dioxide for spray and immersion cleaning. Secondly, suitable cutting fluids and cutting fluid mixtures must exhibit a very low freezing point, preferably ranging between 32 degrees F. to −87 degrees F. Examples of cutting fluids meeting these criteria include 1-decene (100%) and the mixture comprising 1-decene (75%) and oleyl alcohol (25%). Other suitable fluid candidates include propylene carbonate and volatile methyl siloxanes.

When heated and compressed within the cutting zone, cold carbonated cutting fluid of the present invention produce very high local pressures and streaming velocities at cutting surfaces, and absorb cutting heat through Joule-Tompson gas expansion; the carbon dioxide being released as a cooling bubbly flow. These cutting fluids easily drain away from surfaces and residual contaminating fluids on surfaces are easily removed using carbon dioxide-based cleaning chemistries; solid, liquid or supercritical fluid.

Figure 2:
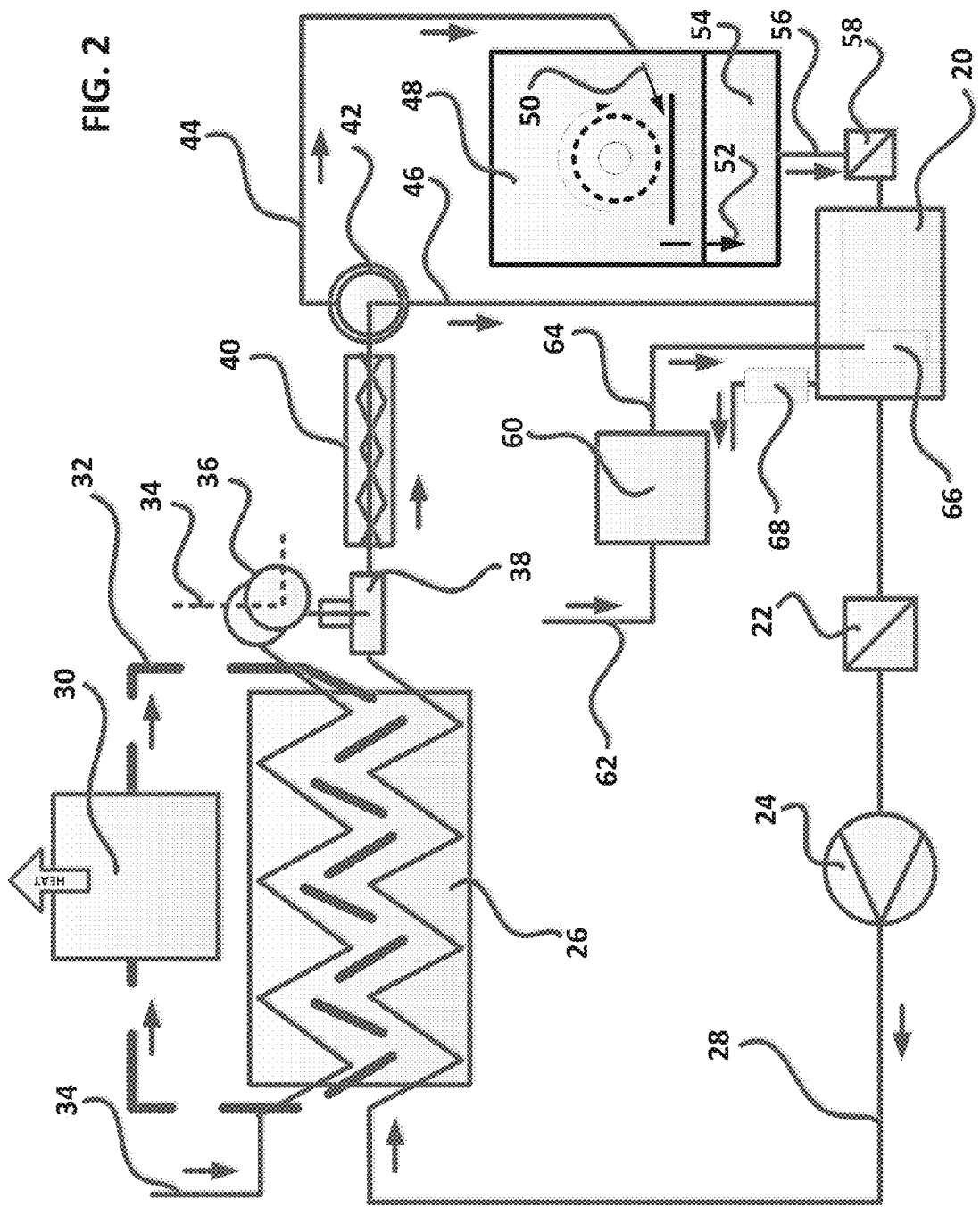
FIG. 2 shows a schematic of one exemplary system for producing cold carbonated (and optionally ozonated) cutting fluids and delivering same to and from a dicing system.

FIG. 2 shows schematically an apparatus for forming and delivering a cold carbonated cutting fluid for an exemplary dicing tool and operation. A cutting fluid suitable for use in the present invention (i.e, 1-decene/oleyl alcohol) is contained in a thermally-insulated sump or storage tank (20) is transferred through a filter (22) and centrifugal pump (24) through a dual purpose heat exchanger (26) via a fluid transfer and heat exchanger pipeline (28). A heat pump (30) is connected to the dual purpose heat exchanger (26) via a heat exchanger fluid pipeline (32). A carbon dioxide gas pipeline (34) also passes through said dual purpose heat exchanger (26). Thus, the exemplary dual purpose heat exchanger (26) is an assembly comprising a thermally-conductive block or split plate heat exchanger that sandwiches or completely envelops three separate and distinct fluid pipelines; (a.) cutting fluid pipeline (28), (b.) carbon dioxide pipeline (34), and (c.) heat exchange coolant pipeline (32). The carbon dioxide pipeline (34) passes through the dual purpose heat exchanger assembly (26) and into a micro metering valve and capillary condensing loop assembly (36). The capillary condensing loop comprise PEEK tubing having a length ranging from 1 feet to 15 feet, and an internal diameter ranging from 0.005 inches to 0.080 inches. The terminal end of the capillary condensing assembly (36) is connected to an injection tee (38), which is connected in-line with said cutting fluid pipeline as it exits the dual purpose heat exchanger assembly (26). The carbon dioxide pipeline (34) may be connected coaxially with the capillary condensing loop so as to pre-cool the incoming carbon dioxide gas, as well as prevent the capillary loop from freezing up. The cutting fluid pipeline exits the carbon dioxide mixing tee (38) and is connected to a static in-line mixer (40) and then connects with a 2-way valve (42). At this juncture, the cutting fluid may be directed into the exemplary cutting tool and operation via cutting tool pipeline (44) or returned to the containment sump (20) via return pipeline (46).

Having thus described the central cutting fluid and carbon dioxide injection and recirculation circuit, following is a discussion of basic operating characteristics. With 2-way valve (42) is the recirculation position as shown in the figure, and with refrigeration heat pump system (30) operating with coolant flowing through coolant pipeline (32), cutting fluid is recirculated through cutting fluid pipeline (28) using centrifugal pump (24) Carbon dioxide gas at a pressure of between 700 psi and 850 psi is flowed through the carbon dioxide pipeline (34), upon which is condensed into liquid carbon dioxide within the carbon dioxide pipeline contained in the heat exchanger assembly (26), upon which flows into capillary condenser assembly (36), upon which it is condensed into a mixture of solid and gas, and which is metered into the cutting fluid flowing through injection mixing tee (38). The cutting fluid recirculation and carbon dioxide injection process continues until a pre-determined cutting fluid temperature is attained as measured with a digital thermometer (not shown) located on the cutting fluid storage tank (20).

Having created a cold carbonated cutting fluid as described above, 2-way valve (42) is repositioned to flow the cold carbonated cutting fluid into the exemplary dicing tool (48) via cutting tool pipeline (44) and into the cutting zone (50). In the exemplary dicing tool (48) as shown, spent cold carbonated fluid (52) flows via gravity into a bottom cutting fluid collection sump (54) and via sump drain line (56) and filter element (58), returning to the cutting fluid storage tank (20).

An optional embodiment of the present invention includes the ozonolysis of the cold cutting fluid to produce a super-oxygenated cutting fluid composition. The apparatus and method of this embodiment are described in detail in a separate and co-pending provisional patent application by the present inventor. Briefly described as follows, an ozone generator (60) connected to a supply with clean dry air or oxygen through oxygen pipeline (62) is connected to the coolant storage tank through ozone pipeline (64) and is injected into the cutting fluid contained within the cutting fluid storage tank (20) using a porous gas sparger (66). While recirculating and cooling the cutting fluid (without carbon dioxide injection) as described above, ozone gas is bubbled into the cutting fluid. Excess ozone and oxygen gas build-up is exhausted from the top of the coolant storage tank (20) through an activated carbon cartridge (68) and back into the atmosphere as trace carbon dioxide and oxygen gas. Following ozonolysis, the super-oxygenated cutting fluid may be carbonated as described herein. Excess unreacted ozone gas and excess carbon dioxide gas are vented to the atmosphere through carbon filter cartridge (68).

Figure 3A:
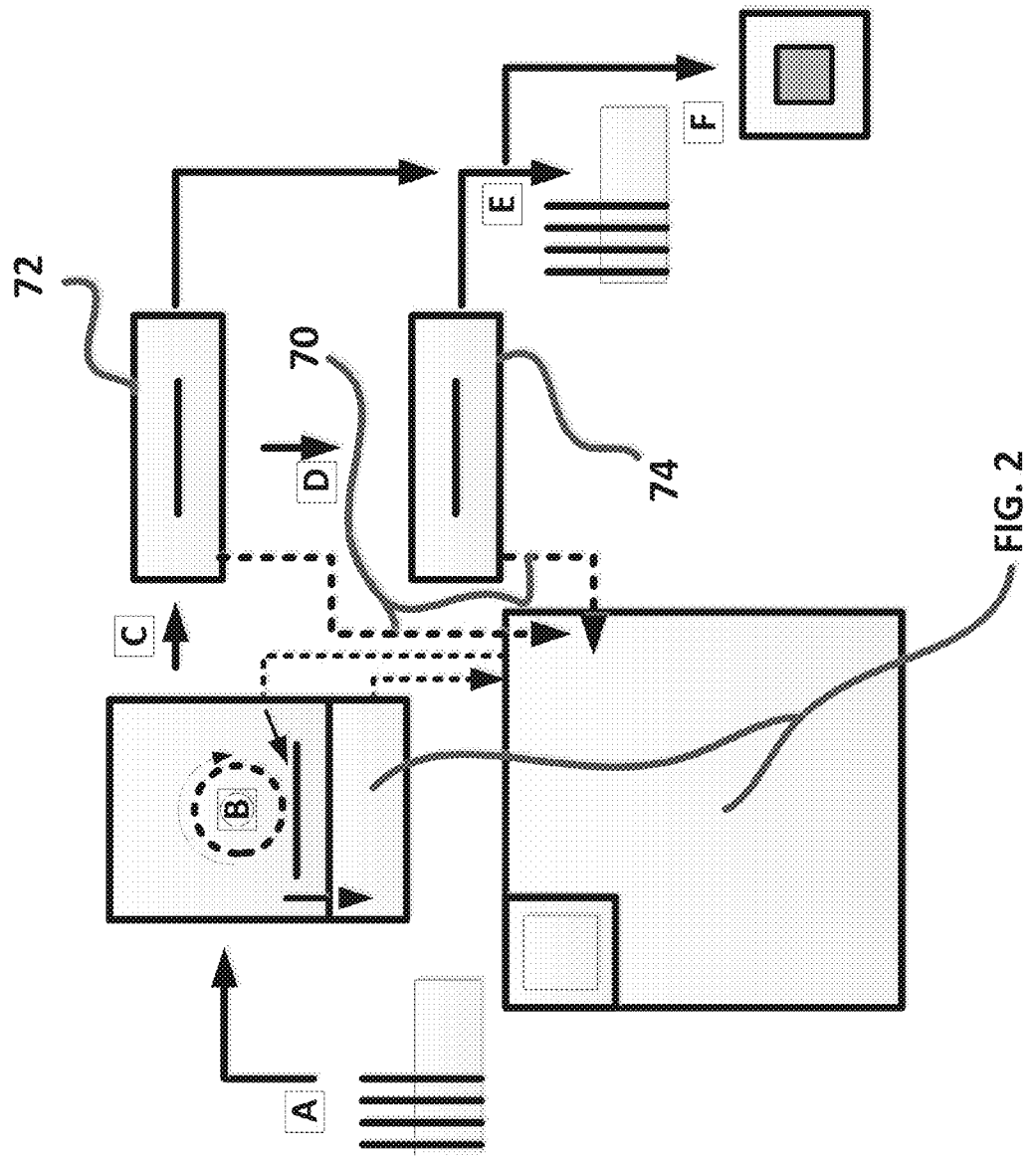
FIG. 3a shows a schematic diagram of one preferred embodiment of the system for delivering and recovering a cutting fluid in a closed-loop dicing operation.

FIG. 3a describes a novel closed-loop system and process for providing integrated carbon-dioxide enabled cutting and cleaning for an exemplary machining process. The exemplary closed-loop system comprises the cold carbonating cutting fluid generation and exemplary machining tool system described under FIG. 2. Fluidly connected (70) to this exemplary cutting fluid-machining system (FIG. 2) are two exemplary carbon dioxide-based cleaning systems developed by the present inventor; a $CO_2$ composite spray cleaning system (72), as described under U.S. Pat. No. 7,451,941, and a centrifugal liquid $CO_2$ immersion cleaning system (74) as described under U.S. Pat. No. 7,601,112.

Now referring to the process flowchart (76) in FIG. 3b, and with reference to the exemplary cutting fluid-machining system shown schematically in FIG. 3a, uncut substrates are transported (A) to and fastened within the exemplary dicing tool and sliced using a diamond cutting wheel (B) while using a cold carbonated (and optionally oxygenated) cutting fluid composition generated with apparatus described under FIG. 2. Following this, diced substrates are transported (C) to an exemplary $CO_2$ Composite Spray™ (Trademark of Clean-Logix LLC) cleaning process and system, by reference to U.S. Pat. No. 7,451,941 issued to the present inventor, to remove residual carbonated cutting fluid for recovery into the cutting fluid generation system storage tank (FIG. 2, (20)) via fluid recovery pipeline (70). Optionally, diced and spray cleaned substrates may be transported (D) to a secondary centrifugal liquid $CO_2$ immersion cleaning process and system, by reference to U.S. Pat. No. 7,601,112 issued to the present inventor, for precision degreasing and recovery of residual cutting fluid into the cutting fluid generation system storage tank (FIG. 2, (20)) via cutting fluid recovery pipeline (70). Finally, diced and precision cleaned substrates are transported (E) to a holding cassette or basket or transported (F) to an inspection station. The system and process thus described recycles nearly 100% of the cutting fluids for reuse and uses only recycled carbon dioxide fluids as the cooling and cleaning agents.

Figure 4:
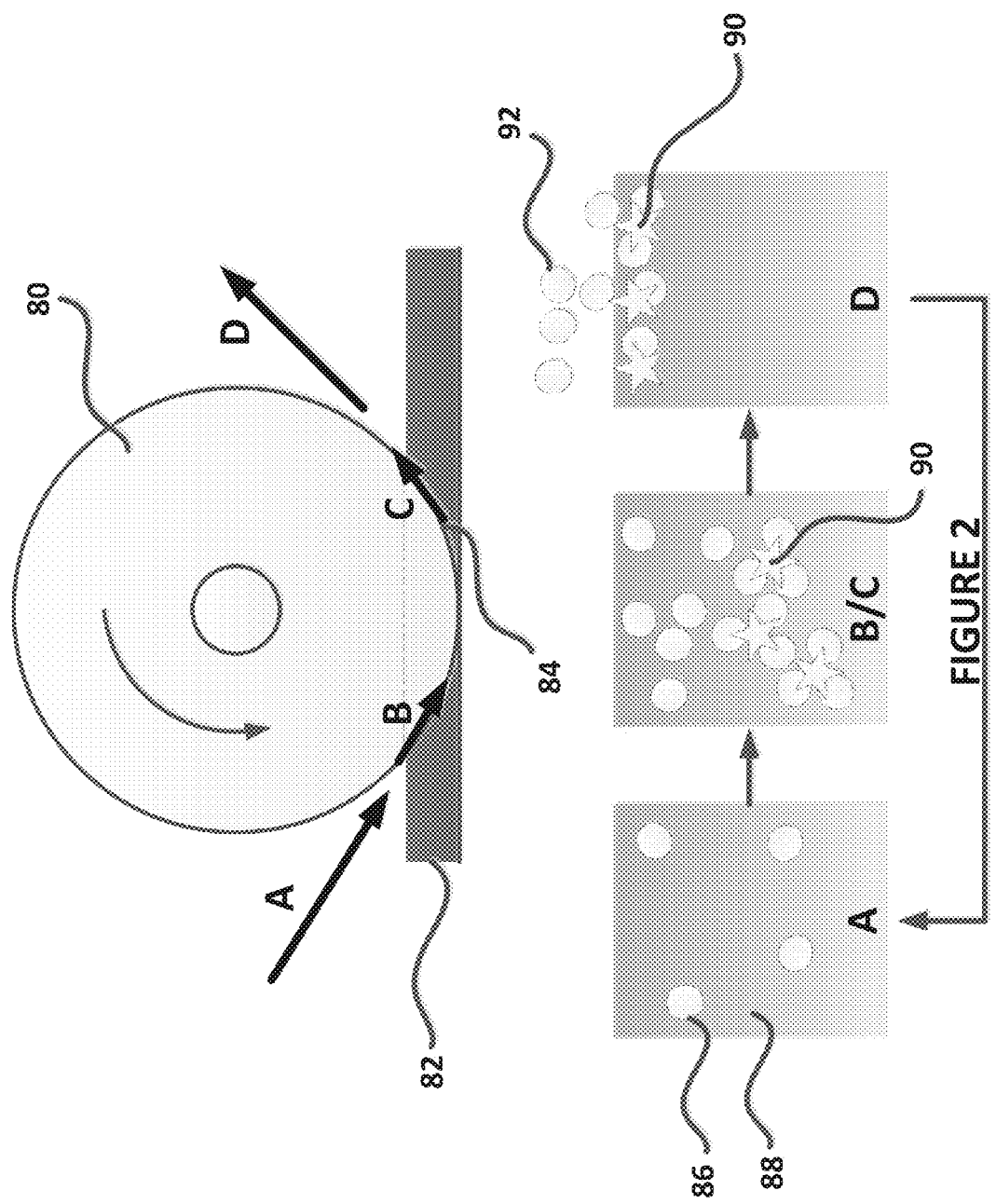
FIG. 4 shows a schematic showing how the JT expansion cooling and frothing benefits an exemplary dicing operation.

Now referring to FIG. 4, the benefits of the present invention, particularly with reference to dicing hard materials using diamond, CBN or Alumina cutting wheels, can be demonstrated by describing the phenomenon that occur during and following the introduction of cold carbonated cutting fluids into the cutting zone. Referring to FIG. 4, cold carbonated cutting fluid (A) derived from the apparatus and method of FIG. 2 is introduced into the cutting zone (B) comprising the interface between the cutting surfaces of cutting wheel (80) and hard workpiece (82), and enters the gap (C) between the cutting wheel face and kerf (84). Finally, the cutting fluid emerges (D) from the kerf under the centrifugal action of the cutting wheel (80). Carbon dioxide gas (86) dissolved in the cold cutting fluid (88) enters the cutting zone (A), and under conditions of extreme pressure, frictional heating, and cavitation (B/C), liberates a froth of carbon dioxide bubbles, which produce thin gas-liquid films (boiling action) that lubricate surfaces, absorb cutting heat and attach to cutting particles (90). Upon discharge from the cutting zone (D), a frothing cutting fluid floats particles (90) and gas bubbles (92), and heat, to the surface for improved separation and filtration in preparation for recovery and reuse operations described under FIG. 2.

It should be noted that the present invention is not limited to the example compositions, and applications described herein. For example, the present invention may be used to form bubbly flow fluids for through-tool and through-spindle machine tool configurations, and is beneficial for dicing, grinding, drilling, tapping, threading, milling, broaching, turning, swaging, stamping, rolling, splitting, among many other machining and metalworking applications.

A method for machining a superhard substrate, which is a vitreous, crystalline, or aggregate material, comprising the steps of:
  a. Cooling a non-aqueous cutting fluid to a temperature below 20 degrees C. and at atmospheric pressure to form a subcooled cutting fluid;
  b. Saturating said subcooled cutting fluid with carbon dioxide to form a carbon dioxide saturated subcooled cutting fluid; and
  c. Applying said carbon dioxide saturated subcooled cutting fluid to the superhard substrate during a machining process.
  d. Recovering said cutting fluid using a carbon dioxide spray cleaning, a liquid carbon dioxide immersion cleaning, or a supercritical carbon dioxide cleaning;
  e. The non-aqueous fluid comprises alkenes, alkanes, alkynes, esters, alcohols, glycols, silanes, siloxanes, silanols, synthetic, semi-synthetic, bio-based, oxygenated fluid, or ozonated fluid.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. The terms "a" or "an", as used herein, are defined as: one or more than one. The term plurality, as used herein, is defined as: two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Any element in a claim that does not explicitly state "means for" performing a specific function, or "step for" performing a specific function, is not be interpreted as a "means" or "step" clause as specified in 35 U.S.C. Sec. 112, Paragraph 6. In particular, the use of "step of" in the claims herein is not intended to invoke the provisions of 35 U.S.C.

Sec. 112, Paragraph 6. All cited and referenced patents, patent applications and literature are all incorporated by reference in entirety.

I claim:

1. A method for machining a superhard substrate comprising the steps of:
   a. Cooling a non-aqueous cutting fluid to a temperature below 20 degrees C. and at atmospheric pressure to form a subcooled cutting fluid;
   b. Saturating said subcooled cutting fluid with carbon dioxide to form a carbon dioxide saturated subcooled cutting fluid;
   c. Applying said carbon dioxide saturated subcooled cutting fluid to the superhard substrate during a machining process; and
   d. Recovering said cutting fluid using a carbon dioxide spray cleaning, a liquid carbon dioxide immersion cleaning, or a supercritical carbon dioxide cleaning.

2. The method of claim 1 wherein non-aqueous fluid comprises alkenes, alkanes, alkynes, esters, alcohols, glycols, silanes, siloxanes, silanols, synthetic, semi-synthetic, bio-based, oxygenated fluid, or ozonated fluid.

3. The method of claim 1 wherein the carbon dioxide is a mixture of gas and solid.

4. The method of claim 1 wherein the temperature of the cutting fluid is between −40 degrees C. and +20 degrees C.

5. The method of claim 1 wherein the temperature of the cutting fluid is between −20 degrees C. and +10 degrees C.

6. The method of claim 1 wherein the superhard substrate is a vitreous, crystalline, or aggregate material.

7. The method of claim 1 wherein the superhard substrate is sapphire, carbide, ceramic, glass, or silicon.

8. The method of claim 1 wherein said machining process is dicing, turning, lapping, polishing, or grinding.

9. The method of claim 1 wherein said machining process uses a machining tool comprising a dicing blade, a cutting insert, a grinding tool, a polishing tool, or a lapping tool.

10. The method of claim 9 wherein said subcooled carbon dioxide saturated cutting fluid is sprayed at said machining tool or is sprayed through said machining tool.

11. The method of claim 1 wherein said cutting fluid exhibits high solubility for carbon dioxide.

12. The method of claim 1 wherein cohesion parameter of said cutting fluid is between 12 MPa½ and 30 MPa½.

13. The method of claim 1 wherein said cutting fluid contains anti-corrosion, anti-foaming, or extreme pressure additives.

14. A method for machining a superhard substrate comprising the steps of:
   a. Cooling a non-aqueous cutting fluid to a temperature below 20 degrees C. and at atmospheric pressure to form a subcooled cutting fluid;
   b. Saturating said subcooled cutting fluid with carbon dioxide to form a carbon dioxide saturated subcooled cutting fluid; and
   c. Applying said carbon dioxide saturated subcooled cutting fluid to the superhard substrate during a machining process.

15. The method of claim 14 wherein said cutting fluid is removed from the superhard substrate using a carbon dioxide cleaning spray, a liquid carbon dioxide immersion cleaning or a supercritical carbon dioxide cleaning.

16. The method of claim 14 wherein non-aqueous fluid comprises alkenes, alkanes, alkynes, esters, alcohols, glycols, silanes, siloxanes, silanols, synthetic, semi-synthetic, bio-based, oxygenated fluid, or ozonated fluid.

17. The method of claim 14 wherein the superhard substrate is a vitreous, crystalline, or aggregate material.

18. An apparatus for machining a superhard substrate comprising:
   a. A means for pre-cooling a non-aqueous cutting fluid at a temperature below 20 degrees C. and at atmospheric pressure to form a subcooled cutting fluid;
   b. A capillary tube injector, which saturates said subcooled cutting fluid with the solid and gas carbon dioxide to form a carbon dioxide saturated subcooled cutting fluid;
   c. An inline static mixer for combining said subcooled cutting fluid and said solid and gas carbon dioxide;
   d. A spray application tool for applying said carbon dioxide saturated subcooled cutting fluid to the superhard substrate during a machining process; and
   e. A recovering apparatus for collecting said residual cutting fluid from the machined superhard substrate; said recovering apparatus comprises a carbon dioxide spray cleaning, a liquid carbon dioxide immersion cleaning, or a supercritical carbon dioxide cleaning.

19. The apparatus of claim 18 wherein non-aqueous fluid comprises alkenes, alkanes, alkynes, esters, alcohols, glycols, silanes, siloxanes, silanols, synthetic, semi-synthetic, bio-based, oxygenated fluid, or ozonated fluid.

* * * * *